United States Patent [19]

Manduley et al.

[11] Patent Number: 5,043,908
[45] Date of Patent: Aug. 27, 1991

[54] MAIL DELIVERY SYSTEM WITH ARRIVAL MONITORING

[75] Inventors: Flavio M. Manduley, Woodbury; Ronald P. Sansone, Weston, both of Conn.

[73] Assignee: Pitney Bowes Inc., Stamford, Conn.

[21] Appl. No.: 416,738

[22] Filed: Oct. 3, 1989

[51] Int. Cl.⁵ .......................................... G06F 15/20
[52] U.S. Cl. ................................ 364/478; 235/375; 198/349.6; 209/584
[58] Field of Search ............. 364/478, 464.02, 464.03, 364/466, 567; 235/375, 383, 385; 198/349.6, 349.7, 349.8, 502.3; 209/584, 900, 592, 593

[56] References Cited

U.S. PATENT DOCUMENTS

| | | | |
|---|---|---|---|
| 3,785,510 | 1/1974 | Grooteboer | 198/349.9 |
| 3,915,284 | 10/1975 | Knockeart et al. | 198/349.6 |
| 4,630,216 | 12/1986 | Tyler et al. | 235/375 |
| 4,734,865 | 3/1988 | Scullion et al. | 364/478 |

Primary Examiner—Joseph Ruggiero
Attorney, Agent, or Firm—Peter Vrahotes; Melvin J. Scolnick; David E. Pitchenik

[57] ABSTRACT

A self-monitoring mail delivery system wherein mail is tracked as it passes through multiple delivery stages. A schedule is created of expected arrival times at each stage. Should a mail piece not arrive on time, the system is alerted to initiate a search for the late or missing mail piece, or to take other corrective action, such as expediting delivery of late pieces. A data center monitors the operations and provides management information to help enhance deliveries.

19 Claims, 14 Drawing Sheets

MAIL DELIVERY SYSTEM WITH ARRIVAL MONITORING

RELATED APPLICATION

U.S. application, Ser. No. 285,891, filed Dec. 16, 1988, entitled "Central Postage Data Communication Network".

U.S. application, Ser. No. 416,744, filed concurrently, entitled "Mail Delivery System With Package Integrity Monitoring".

BACKGROUND OF THE INVENTION

This invention relates to mail processing, and specifically to improvements in mail processing systems, which will assist central postage facilities in carrying out certain mail handling tasks.

The above-noted, commonly-assigned, related application, Ser. No. 285,891, whose contents are hereby incorporated by reference, describes a mail processing system which assists a postal system in carrying out certain tasks. The underlying concept is work-sharing, that is, pre-processing of the mail to reduce the postal system workload in exchange for certain discounts in postal rates. Among the novel concepts disclosed in said related application is to apply to individual mail pieces coded indicia, and to provide at the various stations which process the mail from the mailer/sender source to the addressee/receiver destination equipment for detecting the coded indicia and thereby establishing at that station the presence of the mail piece. In effect, the system tracks the progress of the coded mail piece through the system. This requires a computerized central station between the postal system and the mailer in two-way communication with the latter, and also in communication with each station.

As is explained in the related application, the two-way nature of the communication link established by virtue of the central station between the U.S. Postal Service and the local user is also capable of two-way transmission. Since the local user has placed a certification stamp onto the individual mail piece, such certification having a unique identifying characteristic, it is possible for the user, utilizing this same certification identification, to check on the progress of a particular item of mail through the U.S. Postal Service system. Thus, by the utilization of encryption and bar or other coding on mail pieces, termed key line coding and provided by the local user facility, a database can be established at the central station identifying the location of various mail pieces at any particular point in the course of delivery from local sender locations, through all central facility locations, to local delivery. This information can be captured at several points of entry into the system. The capture points may include the mailer when the mail piece or parcel is placed into the carrier service, the carrier service when the mail piece or parcel is sorted, when the mail piece or parcel is placed into its delivery channel, when it is received at a bulk mail station, when it is received at each sectional station, when it is received at each central station, and when it is placed into local delivery. In this way, key-line tracking of the mail piece or parcel is utilized to identify the parcel and by so doing with suitable encryption provides the mechanism to identify its location in the system.

Commercial software is also available in the shipping field for managing a variety of logistics tasks, from procurement and supply to customer delivery. One of these known systems provides a data exchange service for entities on a network. In addition, it provides software for shipment tracking and status, including routing of shipments to minimize cost, scheduling shipping dates, and scheduling arrival times, among other information. However, it is not believed that this known system provides up-to-the-minute information as to shipment location, or provides the data or the means to take corrective action for shipment delays.

SUMMARY OF INVENTION

The present invention is an improvement of the tracking system described in the related application. The system described in the latter mainly uses the tracking system to locate individual mail pieces in the system. The present invention provides these additional features.

In accordance with a principal aspect of this invention, the database constructed for tracking the mail pieces through the system is enlarged to include an expected schedule of the approximate dates or times when each tracked mail piece will arrive or be present at each tracking station of the system. This schedule is based upon information present in the database which can anticipate or know, as a result of mailer or system inputs, the sequence of stations through which the mail piece will be processed depending upon the source and destination locations, and the typical or average time it should take for processing through each station. With the schedule in place, the central computer can query each station for the presence of the mail piece at the expected time of arrival. Should the mail piece not arrive on schedule at each station, then the system is triggered to enter a search mode to locate the missing mail piece.

The principal advantage of the present invention is to alert the system that something is wrong as closely as possible in time to the processing station where a discrepancy has been found. This greatly simplifies the problem of hunting down the reason for the discrepancy.

One of the current problems in the system is to reduce or avoid theft or loss of mail pieces, especially mail packages. The failure of the mail piece to arrive on time at a particular processing station represents an early warning that the mail piece has been stolen or lost, between the time that the mail piece entered the previous station and the expected time of arrival at the next station. Localization of the missing mail piece will assist greatly the postal authorities to find the missing mail piece and/or search out the perpetrator of a theft of the mail piece.

In accordance with a further aspect of the invention, a database is maintained at the data center which by polling of the various stations along the route, or by inputs from the stations when the mail piece arrives, automatically keeps current track of the mail piece along its route. This offers a number of important advantages. First, the database could be used by the data center to forecast arrival times and thus workloads at each station, and could transmit workload data to the stations so they can marshal their resources to handle incoming mail pieces in large quantities. Second, the continuous monitoring of the mail piece flow through the system, station workloads, and resource utilization provides information of great value to the management of the delivery system for improving performance. An additional benefit is that up-to-the-minute information on the state of the delivery system will also indicate early warning of delivery problems, which would be evidenced by delivery delays or late arrivals or missing pieces. Early warning of problems means that swift corrective action can be taken to avoid or mitigate such problems.

A further feature of the invention is for the system not only to report arrival delays, but also automatically, if possible, expedite the remaining delivery schedule to make up for the lost time. For instance, the data center could recalculate the remaining routes, with the objective being speed instead of, say, cost, which would allow the delayed mail piece to make up for earlier delays in its passage along its scheduled route.

SUMMARY OF DRAWINGS

The invention will now be described in greater detail with respect to particular embodiments, reference being had to the accompanying drawings, wherein.

DETAILED DESCRIPTION OF PREFERRED EMBODIMENTS

The system of the present invention is similar to that described in the referenced related application, and for completeness' sake, a detailed description of that system follows below.

Figure 1:
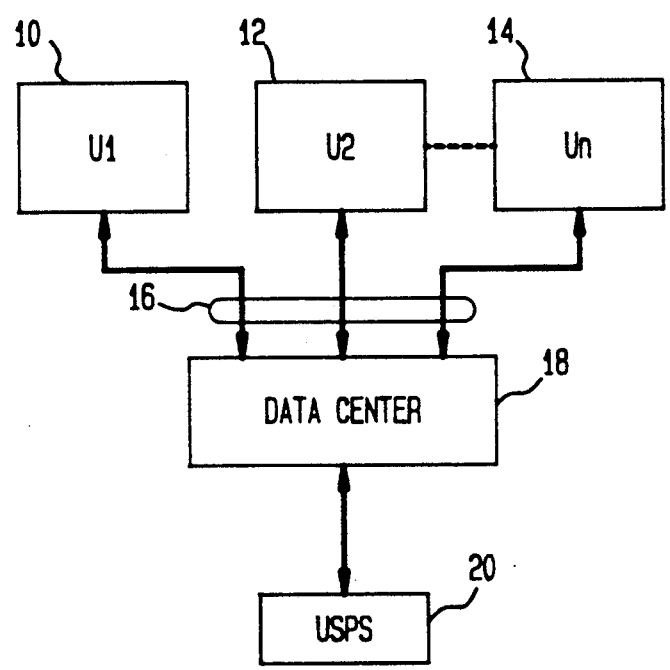
FIG. 1 is a functional block diagram illustrating the relationship between the data center, the U.S. Postal Service, and the local users.

With reference to FIG. 1, a plurality of user or mailer stations or facilities, designated as $U_1, U_2 \ldots U_n$, and identified as 10, 12 and 14 are shown. It will be understood that multiple user stations are possible in excess of the three shown, and that these are shown by way of example only. These stations are coupled by means of an interconnection network, illustrated generally as 16, to the data center 18, which in turn may be appropriately coupled by means of a secure line or the like to the U.S. Postal Service 20 or other authorized mail deliverer. The data center 18 can be a facility run by a commercial operation, such as Pitney Bowes, Inc., the assignee of the present invention. Each of the blocks 10, 12, 14, 18 and 20 contemplate the use of data processing components, each appropriately interlinked by means of high speed telecommunication links or the like for the purposes of exchanging information. It is also within the scope of the invention that the U.S. Postal Service will maintain an appropriate computer facility, not otherwise described herein, which will possess the capability of uploading and downloading specific pieces of information upon request by the data center, and relating to appropriate postal rules and regulations which will effect the use of certain discounts in mailing postal rates, as well as other factors necessary for the concept of shared work services which will be certified by each of the individual user stations in order to qualify for reduced rate requirements when mail is received in the U.S. Postal Service facilities. The communication link is also contemplated as a two-way link between units 18 and 20, wherein the U.S. Postal Service will have the capability of monitoring specific operations within the data center in order to ensure the data center is operational in accordance with rules and requirements which may be imposed by the Postal Service from time to time. The monitoring operation is a periodic unscheduled communication link examination of certain storage areas of accessed memory locations for confirming proper operations. Of course, visual on-site inspections and examinations may also be made.

Figure 2:
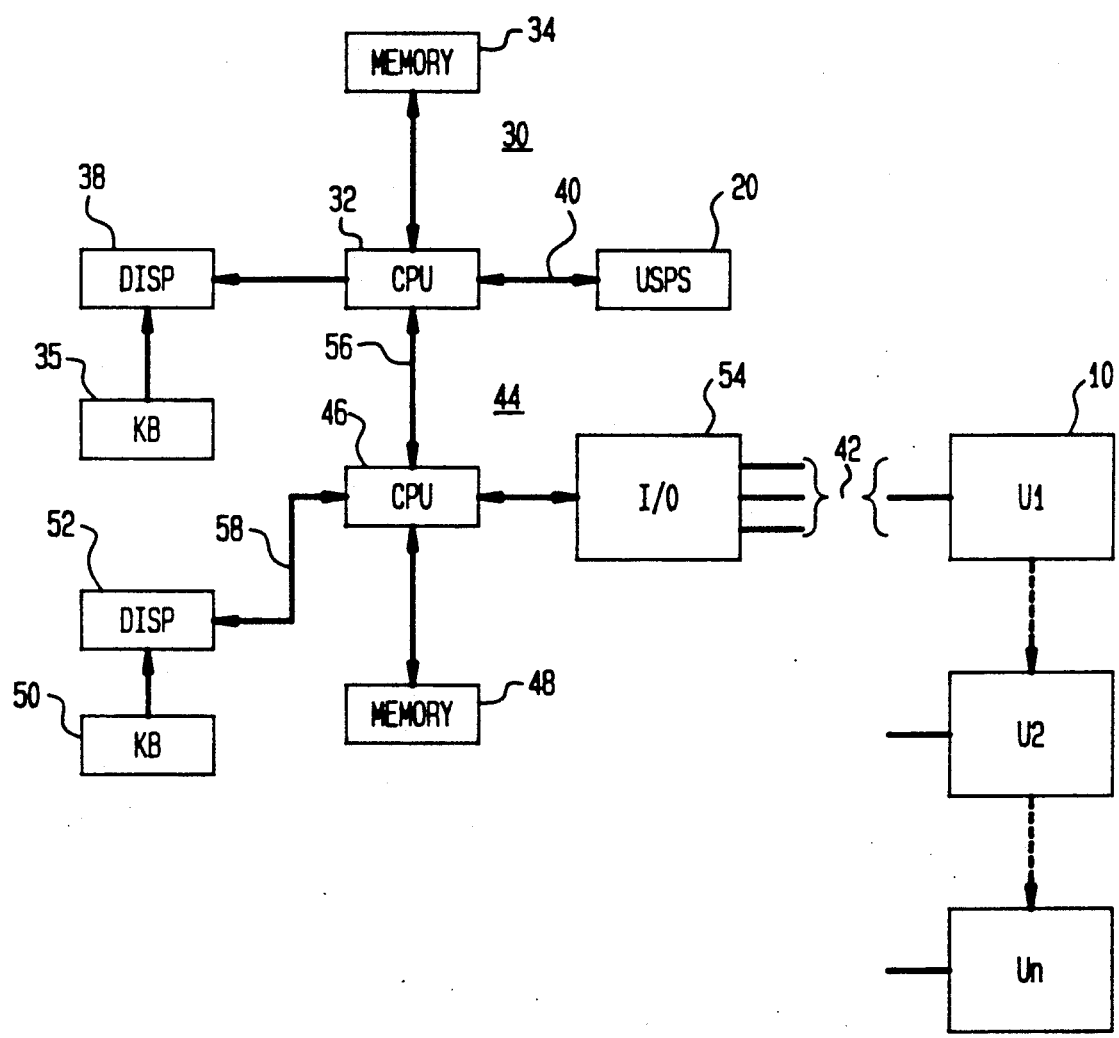
FIG. 2 is a more detailed block diagram illustrating a data center.

With reference to FIG. 2, a more detailed functional component relationship of the data center is illustrated. Thus, the data center includes a first data channel 30 which includes a CPU 32 having a program memory 34, a keyboard 36 and an appropriate display 38 coupled thereto. Data communication link 40 interconnects CPU 32 to the US Postal Service 20. The user units 10 are coupled via appropriate telecommunication data links 42 to a second data channel 44 which includes a CPU 46, a program memory 48, a keyboard 50 and an appropriate display 52. The CPU is coupled to the data links 42 by means of a multi-channel I/O device 54 capable of high speed data communication.

In operation, two-way communication between the data channel 30 and the U.S. Postal Service 20 provide a continuous interchange of information regarding updates of U.S. Postal Service rules and regulations required for the continuous certification use by the local users 10. In addition, the data channel 30 may also be manually interrogated by means of keyboard 36 for inquiring of the Postal Service for specific information which may be employed with regard to compliance with certifications, the answering of specific data questions, or other uses requiring specific interrogation by means of the central station to the U.S. Postal Service. Since the U.S. Postal Service link is a two-way communication over channel line 40, it is possible through this link for the U.S. Postal Service to interrogate and monitor the operation of the first data channel 30 and the second data channel 44, for compliance with quality control and other security compliances which may be required by the U.S. Postal Service.

Turning now to the second data channel 44, high speed continuous two-way communications to provide a continuous update of US Postal Service requirements for certification, servicing and diagnostics, training, and other information interchange, are effected by means of the CPU 46 operating through the high speed data channel 54 interfaced along with communication lines 42 to the multiple user network $U_1, U_2 \ldots U_n$. Operating under control of the program memory 48, the CPU 44 is contemplated as a high speed multiple processing information apparatus of conventional design such an IBM 3083 or a DCVAX unit which may handle multiple requests from any one or more of the users simultaneously through the multiple channel IO device. Keyboard 50 and display 52 may be utilized for manual information interchange between any of the local users and the information operator. Although only a single keyboard display unit is illustrated, it will be understood that dataline 58 is a schematic representation of the existence of a multiple number of display keyboard combinations evidencing the use at the central station of a plurality of key operators available to answer user questions upon interrogation.

Figure 3A:
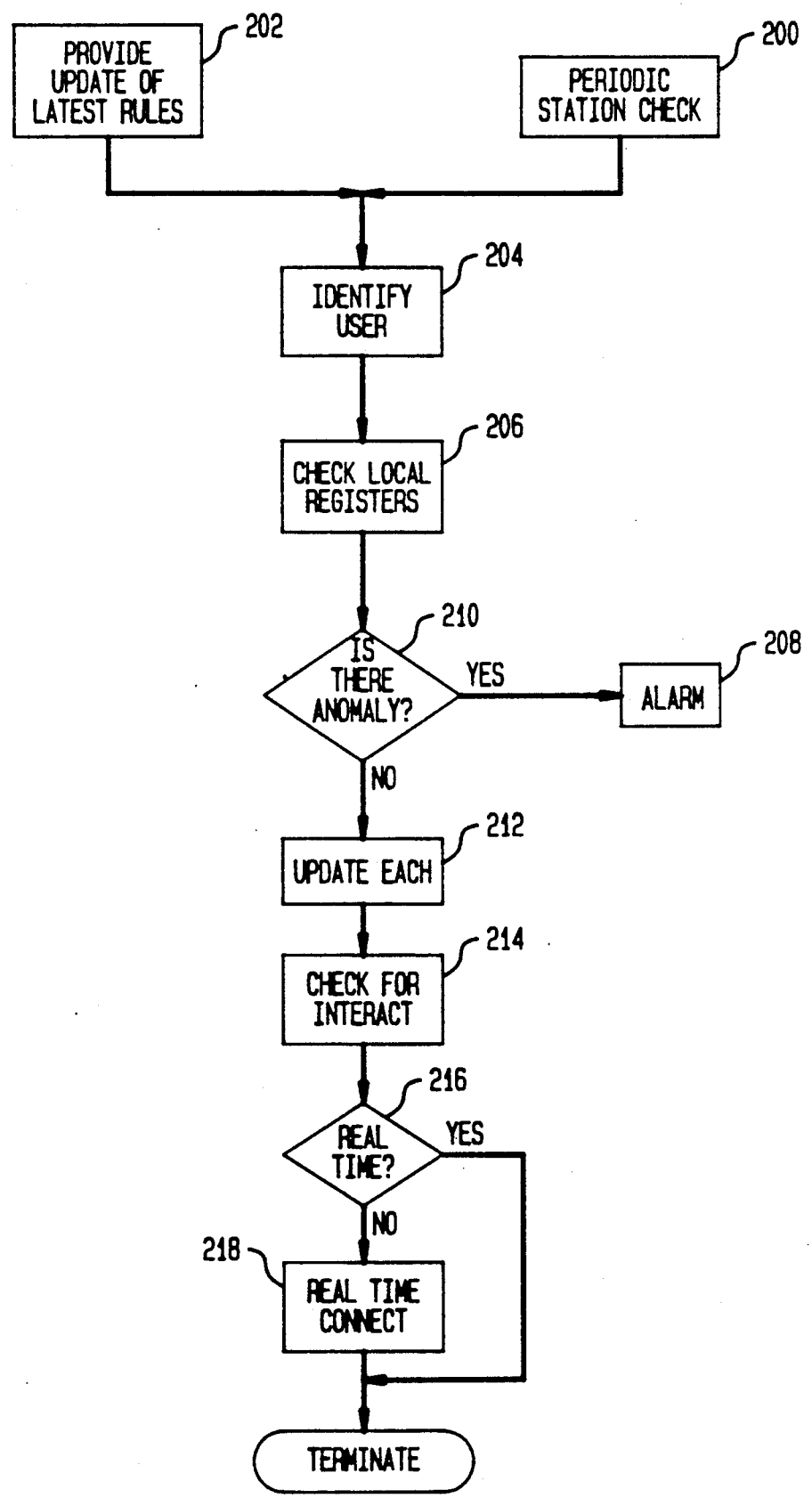
FIG. 3A-3C illustrates flow charts for the data center.
Figure 3B:
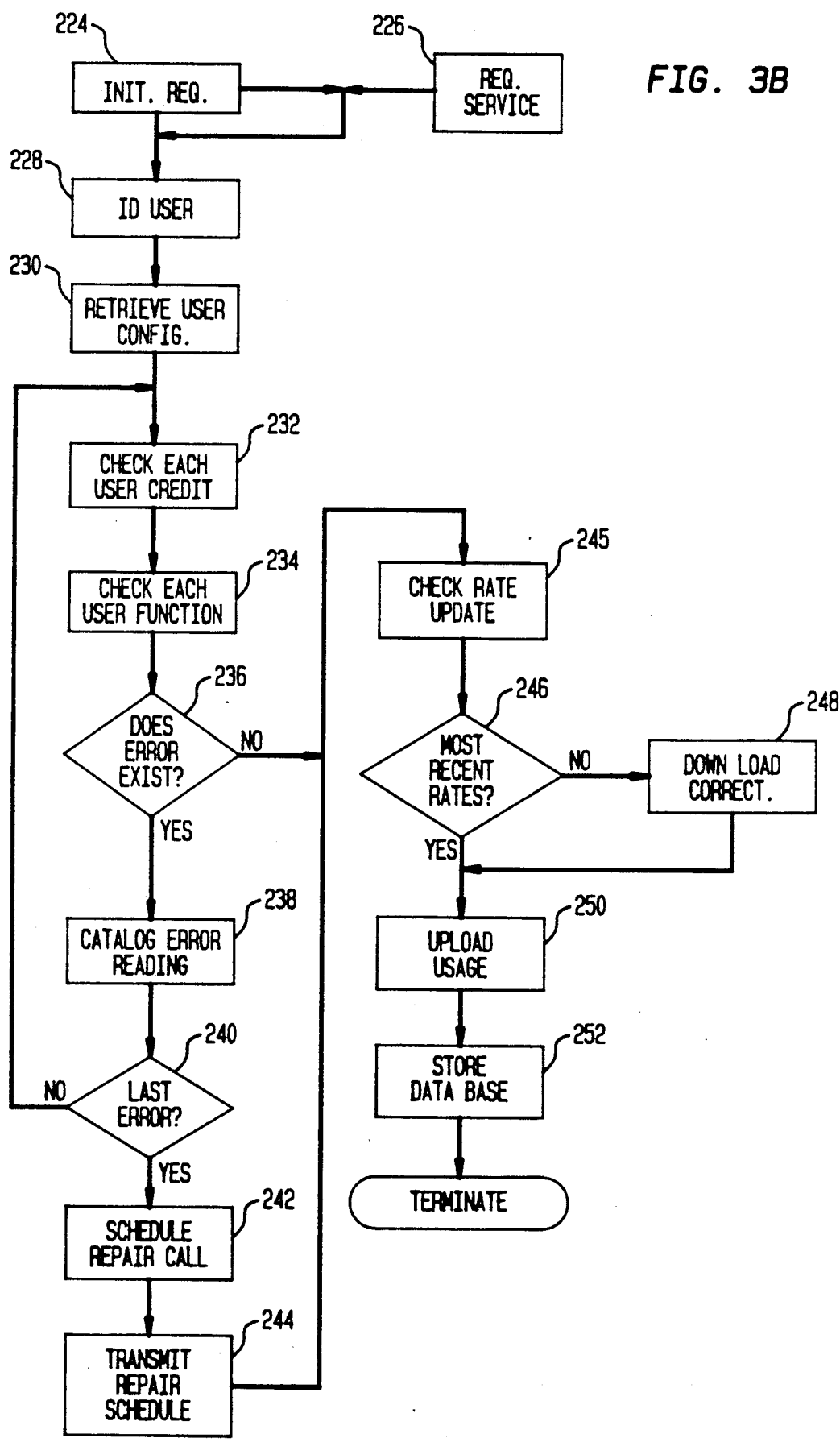
Figure 3C:
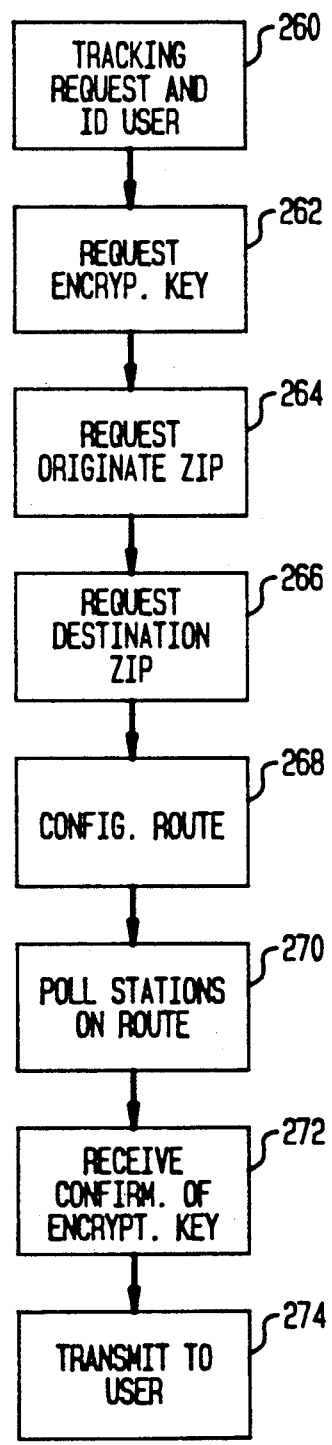

Referring to FIGS. 3A-C, a general flow chart illustrating the operation of the arrangement of FIG. 2 is shown. The flow chart consists of three portions, FIGS. 3A, 3B, and 3C. FIG. 3A illustrates the program routine governing issuance of appropriate updated instructions and status checking for compliance with certification operations in accordance with US Postal Service rules and regulations. FIG. 3B illustrates a diagnostics and service routine followed by the central processor unit with respect to each of the local user stations by which appropriate diagnostic maintenance and service calls, as well as security monitoring and monitoring of specific internal functions of the postage meter having to do with secured aspects, such as the meter, certification, and descending register funds balances, may be maintained. FIGS. 3C illustrates a software routine whereby two-way communication regarding the tracking of specific mail pieces may be accomplished upon user requests.

Referring to FIG. 3A, compliance with U.S. postal service rules is maintained by ensuring that the data center continually and regularly updates the rates and regulations such as postal rates, bulk mail rates, mail size requirments, new zip codes, etc. The inquiry can be initiated by the data center as a periodic status check 200 or by a request to provide an update of the latest rules 202. The data center thus establishes a data link, identifies the user 204, as by a code stored in the local unit nonvolatile memory. The status of local registers are included 206, and an alarm condition raised 208 if an anomaly is detected 210. In the absence of such a condition, the updating is performed 212. Interrogative 214 real time requests 216, such as an on-line user can be dealt with at this time 218.

Referring to FIG. 3B, the central unit routine for establishing diagnostics and servicing at a local user location is illustrated. The routine begins with a service request 224, initiated by the local user or a service request initiated by the central unit 226. In either event, after establishment of channel communications, identification of the user by retrieval of a specific identification code stored within the permanent memory of the user location is made 228. The user configuration is then retrieved 230 at the central unit memory, and a credit check of the user is made 232. Next, each user function is checked 234 and a decision made as to whether an error exists 236. If an error does exist, the error reading is catalogued. If the error is not the last error 240, the system recycles to check additional user functions until an error free routine results. In this manner, each individualized user function may be reviewed. As discussed hereinabove, each piece of equipment contained within a user unit may be reviewed in this manner. Thus, units such as optical scanners, feeders, certification units, postage metering equipment, CPU diagnostic routines, and other routines designed to test and maintain each individual function contained within a respective user unit equipment may be accomplished. At the completion of a complete diagnostic check, and assuming no additional errors were found, a repair schedule call may be programmed by the central unit in accordance with the schedule of the local repair technicians 242. Once a time schedule has been arranged, the schedule may be transmitted to the user 244 for display upon local screen displays. If the user functions were error free, then the decision block after the checking of each user function, indicating no error, branches the program to a rate update routine. The rate update routine is also branched at the completion of the transmission of a specific repair schedule, should errors have been found during the diagnostic programming check.

The check rate update examines the central program memory of each user unit 245 to determine that the unit has the last, and most recent, rates programmed into the local user unit 246. If the local unit does not have the correct update, then a downloading of a correct user rate schedule is made 248 along the appropriate transmission channel to the appropriate memory location contained within the user equipment. At this point, the program continues by uploading all local usage data from the local user unit 250. This local user update may include such information such as local user mailing volume, including destination zip codes in a recent mailing time period, processing of certain types and sizes of mail, and other user workloads so as to enable the Postal Service, by maintaining such information in a stored data base 252, to forecast workloads, transportation requirements, management of asset inventory, creation of mailer profiles, and other information which may be employable to establish process controlling to better manage U.S. Postal Service resources. Furthermore, this information may be utilized to generate a series of reports to the user considering the status of the equipment, the history or record of user maintenance, and the quantity and time of service calls necessary for servicing the equipment. In addition, the establishment of a communication link between the central data station and the user facility, permits the central station to keep a permanent record, available for inspection by the U.S. Postal Service, to confirm uses of local users of such critical elements as postage requirements and error free data operation which best insure integrity of the local system to the satisfaction of the U.S. Postal Service requirements, thereby enabling certification processes to be established allowing work sharing concepts to be employed for the purpose of reducing mailing rates.

Referring now to FIG. 3C, a routine initiated by the local user through the central station for tracking specific pieces of mail based upon encryption keys placed by certification equipment on pieces of mail is illustrated. Thus, a tracking request is received over the two-way data channel link by the central unit 260. The central unit then requests the encryption key once communication and identification have been established between the central unit and the local user 262. The next piece of information requested is the originating source zip code 264, and then the destination zip code 266. The central data station then configures the route normally encountered through the U.S. Postal Service by a piece of mail from the input originating zip code to the destination zip code 268. The configured route will include each of the respective processing stations, including delivery channels, encountered by a piece of mail normally delivered between the respective inputted originating zip code and destination zip code. Once the configured route has been calculated by the central unit, each of the specific stations on the route are polled 270, again through the two-way communication link through which the central unit has access, and the specific location of the particular encryption key is determined. Once confirmation of an encryption key at a specific location is confirmed 272, this information is transmitted to the user station 274. The user station will then utilize this information, as will be set forth in further detail below, to determine the specific location of the piece of mail pursuant to the user request.

Figure 4:
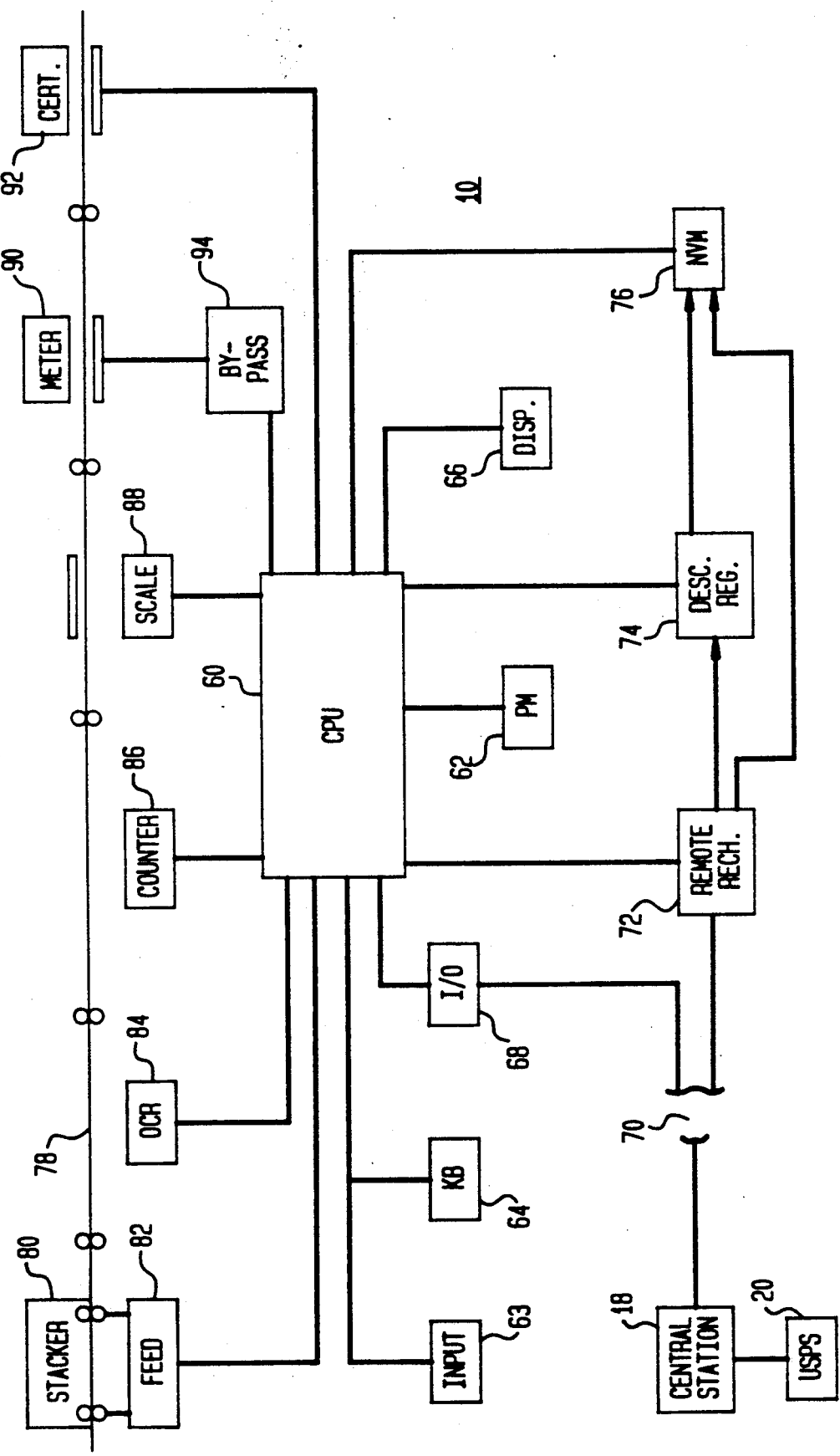
FIG. 4 is a more detailed block diagram illustrating a user station.

Referring to FIG. 4, the function block diagram illustrating the interrelationship of components within each individual user station is illustrated. The central user station operates under the control of a CPU 60, which includes a RAM memory and appropriate control registers. Coupled to the CPU 60 is a program memory 62 which defines the essential function of the system, including updating instructions and rates used in the local user units, diagnostic monitoring, a two-way communication link establishing a tracking facility utilizing the encryptic key represented by the certification, and interface capabilities with respect to the central station for the downloading of training information which enables operators at local stations to understand and comply with specific requirements imposed by the U.S. Postal Service with respect to the certification process. Coupled to the CPU 60 are a keyboard 64 for the manual entry of data requests and other information into the CPU, display unit 66 and an I/O channel 68 coupled by means of a data link 70 to the central station 18. Accounting information and funding to the local user 10 is effected through the data link 70 from the central station 18 to the remote recharger mechanism 72, operating in accordance with conventional recharging techniques, such as disclosed in U.S. Pat. No. 4,097,923, assigned to the assignee of the present application. Remote recharging unit 72 charges a descending register 74, in conventional manner, which keeps track of descending balances charged from time to time in accordance with mail requirements. Non-volatile memory unit 76 is employed to maintain security of information during periods of time when local user unit 10 is not operating. Non-volatile memory 76 receives descending register balances as part of a shutdown routine, along with other security data which may be applied from the active memory of the CPU 60. One of the features of the central unit 10 is that the remote recharging operation carried on in remote recharging circuit 72 is maintained through the data link 70 to the central station 18, and operates independently of the OFF/ON status of the local user unit 10 for monitoring purposes. Thus, even if the local unit 10 is turned off, central station 18 through data link 70 may inquire through the remote recharging unit of the status of certain pieces of information which are maintained either in the RAM memory portion of the CPU 60 during on-times of the unit 10 or in the non-volatile memory 76 during inactive status periods.

The concepts of work sharing entail the performance of certain postal service functions by the user in a secure manner so as to enable the user to apply not only postage but to also apply certification, as an imprint on the mail piece, which will be accepted by the postal service that the services certified were in fact performed by the user and thus enable the user to be entitled to further mail rate reductions. Communication in contrast may also be by means of a code or other form with the relevant information transmitted in encrypted format. The information may be scanned and used to automatically set the postal equipment at the user site to proper settings, both for postage and for usage scheduling, without direct user intervention, thus enhancing security and efficiency.

Certification information is provided to the CPU through a plurality of inputs along a mail path designated as 78. Mail piece documents which are stacked in appropriate feeder-stacker unit 80 are, under control of CPU 60 through feeder-unit 82, driven along the mail path 78, past OCR unit 84 where printed material on the mail piece is read, past counter station 86 where individual pieces are counted, to the scale unit 88 where the mail piece is weighed, and thence to a metering station 90 for application of appropriate postage and finally to a certification station 92 where appropriate certification stamps may be placed on the mail piece to indicate compliance of the mail piece with all the criteria that have been set under work sharing requirements required under the U.S. Postal Service regulations. Since the unit may be capable of handling prefranked mail, a meter bypass network 94 operating under control of the CPU, provides for bypassing of the mail piece of the metering station 90 without the necessary application of additional postage. Problems encountered in short-weight mail may be adjusted by appropriate decrement of the descending register balance in descending register 74 under program control through CPU 60, based upon differences detected by the computer between applicable postage rate requirements and the actual mail run being passed through the user station 10. An example of short-weight mail is disclosed in copending application, Ser. No. 285,146, filed Dec. 16, 1988, and assigned to the assignee of the present application.

Figure 5A:
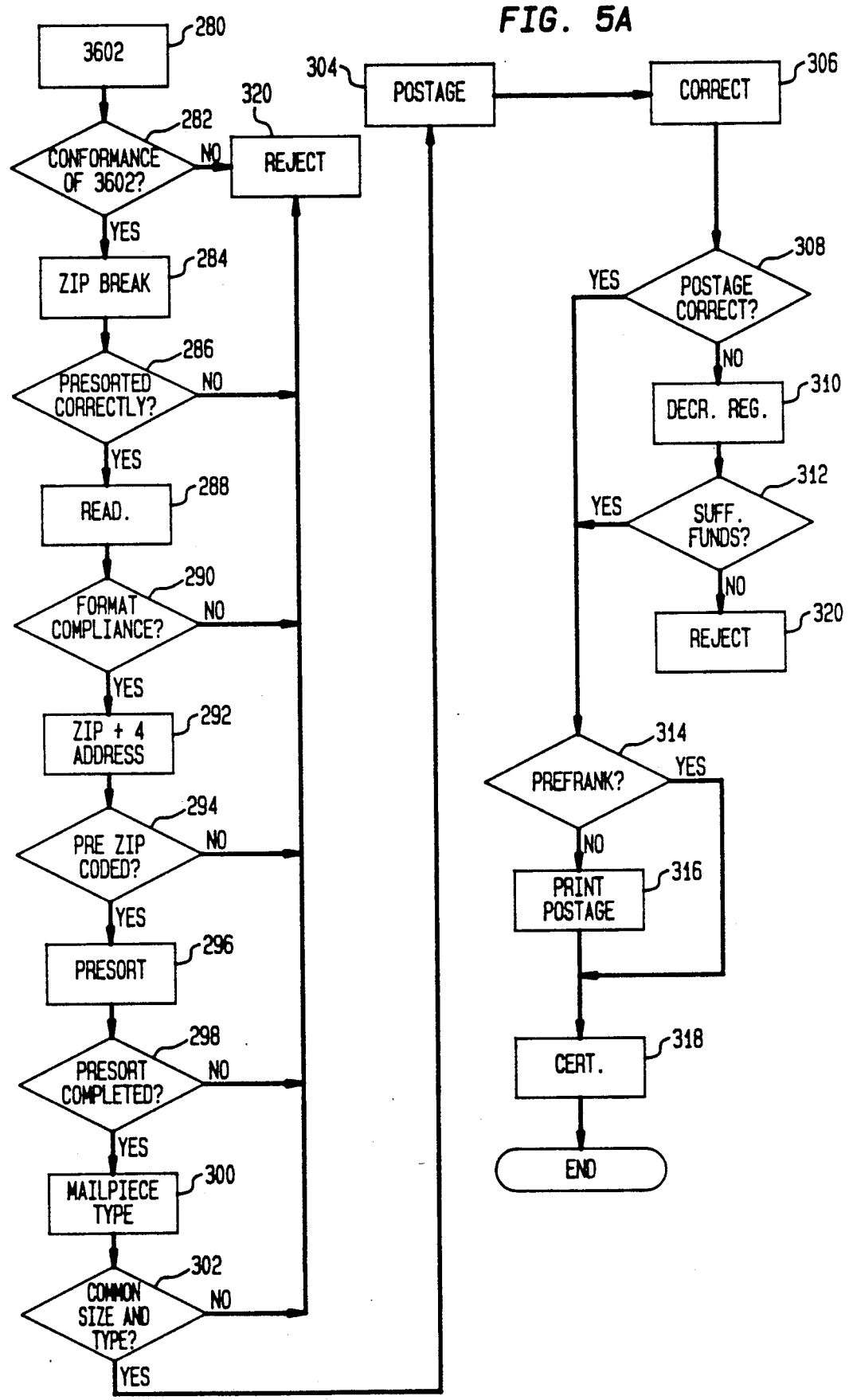
FIG. 5A-5D are flow charts illustrating the operation of FIG. 4.
Figure 5B:
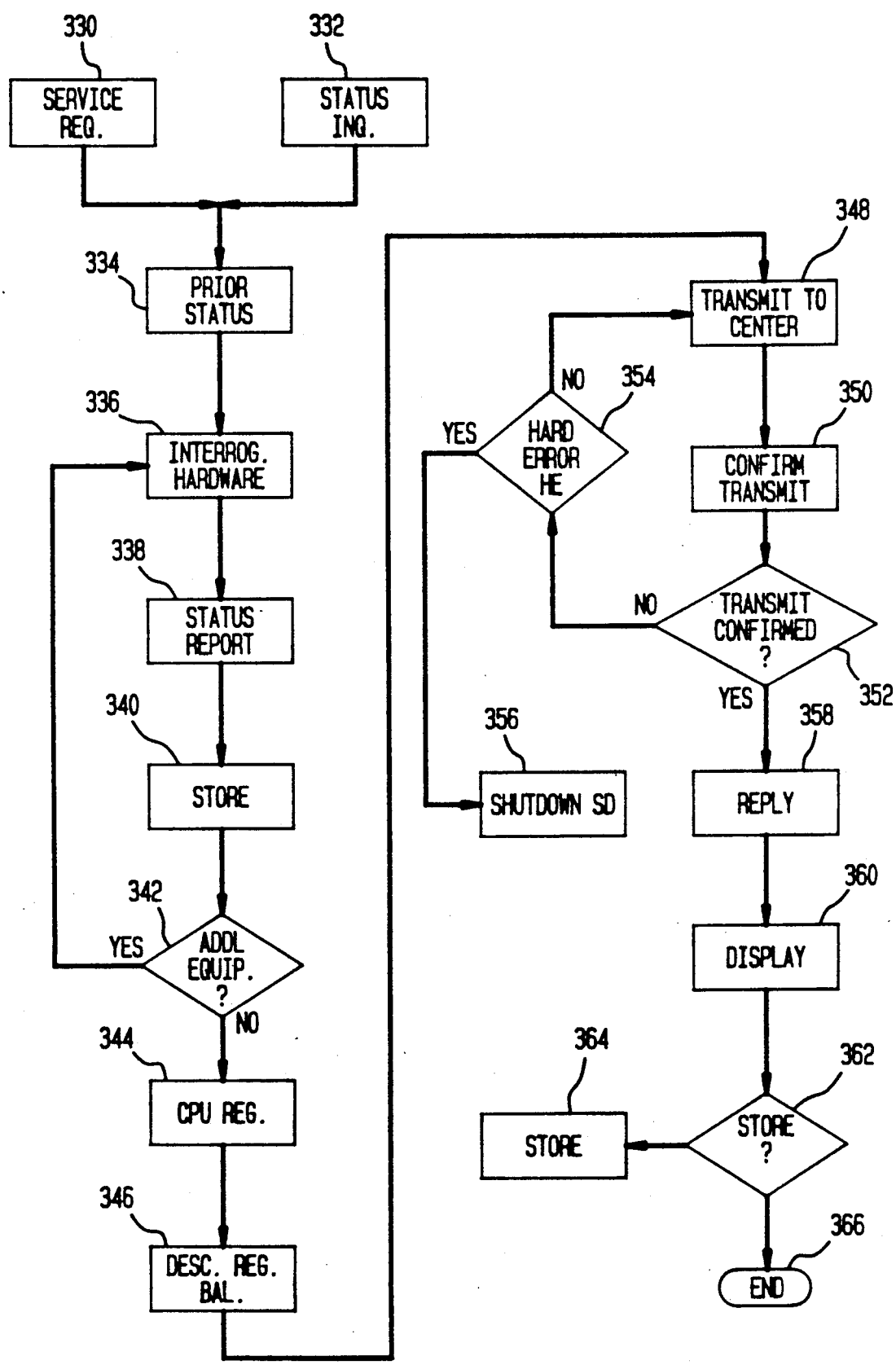
Figure 5C:
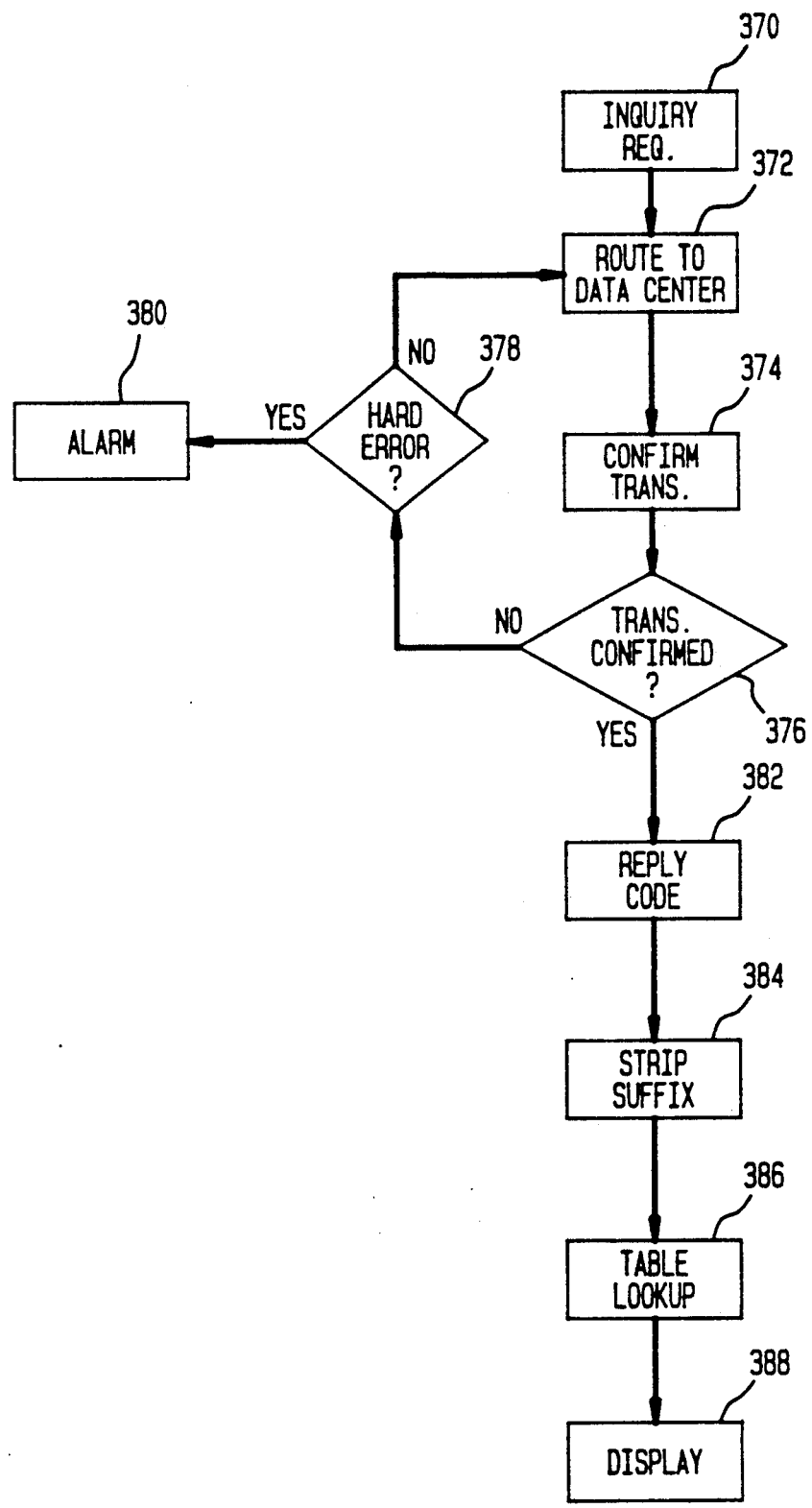

Referring to FIGS. 5A–5D, some of the specific software routines governing the operation of the user is illustrated. Thus, in FIG. 5A a work sharing flow chart is shown. In FIG. 5B the diagnostics flow chart is shown. In FIG. 5C mail tracking is shown, and in FIG. 5D training and other intercommunication system operation are illustrated. Operation of the system is a complete through pass including all stations, with reject operations taking place at one point, between the metering station and the certification station. It will be apparent to those skilled in the art that other rejection points may be placed along the mail path; however, the high speed nature of the data processing system, with an eye towards the economics, dictate as a preferred embodiment a single rejection station located at the downstream point. All data regarding specific mail runs are accumulated in the CPU, and a rejection or accept decision made just prior to entering the certification station. Thus, referring the FIG. 5A, first, all of the data received is analyzed for 3602 requirements 280, including weight, volume, class of mail, applied rate, etc. This information is correlated by means of the OCR module, a count module and a scale module, taking into account previously inputted data either by means of the keyboard or by means of other inputting means such as an optically character read manifest or a data communication link which comprises a separate input channel into the CPU 60. Each of the elements shown on the flow chart of FIG. 5A are program selected in accordance with the program loaded into the CPU governing the application of a specific mail run and in accordance with the work sharing operation selected by the user. Thus, assuming a plurality of work sharing concepts selected by the user for a rate reduction, with the understanding that any one or more of the elements selected as shown in FIG. 5A may be eliminated in accordance with the different selected package by the operator, then conformance 282 to the 3602 information next relates to acceptance of zip rate 284, meaning that mail has been presorted appropriately 286 by zip code, thence to readability 288, indicating that the mail complies 290 with a certain format thereby eliminating the need of the Postal Service to have multiple format reader devices, thence to a zip plus four address 292 meaning that the mail has been pre-zip coded 294 with the extended zip code thereby reducing the sort capacities and procedures required by the Postal Service, and thence to a presort station 296 indicating that the mail has undergone certain presorts 298, thereby further reducing the work load of the Postal Service, and thence to a mail piece type 300, indicating that the mail is all of a common size and type 302, thereby further reducing the amount of segregation necessary by the Postal Service, and thence to a postage station 304, where in accordance with all of the foregoing requirements, the correctly applied postage 306 is confirmed 308 as having been placed upon the mail piece, either by the metering station, or by means of a pre-applied postage franking mechanism. Failure to apply the correct postage in pre-printed postaged mail pieces does not result in rejection of the mail piece, but simply results in the appropriate debiting 310 made to the decremented register in the local user's unit, and thence having the mail piece passed to the certification station for certification indicating that correct postage has been debiting to the account of the user, even though same may not be appropriately indicated on the mail piece. By including the certification of correct postage, one last check, that of short paid mail, also does not have to be made by the Postal Service. Thus, compliance with each of the requirements set forth in the flow chart of FIG. 5A, representative of a maximized work sharing concept, substantially reduces the work burden of the Postal Service. This enables substantial reduction to be passed back to the user in the form of rate reductions. Compliance with the foregoing, as previously stated, is physically indicated on the mail piece by means of an appropriately entered certification. Certifications may be appropriately encrypted to prevent duplication, and may be encoded in such a manner as to afford the Postal Service means to validate such certification on a random spot check basis. Methods and apparatus for effecting such verification based upon encryption are disclosed in copending application Ser. No. 188,366, filed May 2, 1988, assigned to the assignee of the present application. FIG. 5A also illustrates between each of the respective blocks a plurality of decision blocks or diamonds, indicating compliance or non-compliance with the operation indicated in the previous block. The affirmative outcome of the decision block, indicated by a Y, indicates passage to the next decision making step. A NO or inability to comply with the requirements in the prior block is indicated in the decision block with an N. The outcome of the N is the passage of a signal through the reject station. Such passage to the reject station has been indicated with respect to the first block, and it will be understood that each of the subsequent decision blocks possess similar capabilities. After the mail piece size check, the mail piece is passed to a postage check and the test to indicate whether or not the postage to be applied is correct 308. Assuming it is correct, postage is printed 316 and the mail is passed to certification 318. If the postage is not correct, the program is passed to the step of decrementing 310 the descending register by the correct amount. If the descending register is not decremented properly, due to insufficient funds 312 in the descending register or the like, the mail piece is rejected 320. If it is accepted, it is also passed onto the certification station. If the mail piece is not pre-franked 314, the program branches through an additional postage printing operation.

Referring now to FIG. 5B, a flowchart indicating the operation of the system for effecting service diagnostics is illustrated. The data center interrogates the user system periodically to determine the status of the equipment. Information that is obtained during the interrogation may include the usage rate and status of various components and subcomponents of the system. Information may also include status of the descending registers and any other secured aspect of the equipment which is of interest to the central station and also to the user. This information is utilized to generate a series of reports to the user, including monthly statements, concerning the status of the equipment, the need for user maintenance and the need for service calls by the data center. The system may also enable the scheduling of the service call by leaving a message on the equipment indicating that a service call has been scheduled at a particular time, including leaving the name of a specific service individual, all of which may be displayed on the user's terminal. With specific reference to FIG. 5B, service request or status inquiries will have a common effect of initiating this routine. Thus, the status inquiry which may originate from the data center, or a service request, which may originate from the user, both act first to activate and display any prior stored information regarding previous service requests or a service call that may already be scheduled and in progress for display by the operator 334. The system next interrogates each of the specific hardware elements shown in FIG. 4, which interact/react with the mail feed path 336. Thus, the hardware interrogated will include feed mechanism 82, or OCR reader 84, the counter 86, the scale 88, the meter 90 and the certification 92. Each of these devices will include appropriate monitoring circuitry for indicating, in a specific stored location, each of the current status operations of each of these devices. Status may be monitored by means of a startup initialization routine effected by the CPU, and continuously monitored during operation of a mail feed path. Two types of monitoring conditions are evident. First, a monitor condition which suggests the need for service but will not interfere with the operation of the feed path. Such monitoring condition will be continuously indicated by means of a status check. These may be referred to as soft defects. Additional defects which would actually interfere with the operation of the device, such as inability to read at the OCR unit or inability to apply postage due to a defect in the meter, or other inabilities of inoperative devices, known as hard defects, will cause a shutdown of the mail path and provide to the CPU an indication of the specification problem by virtue of the status of each of these devices. The hardware elements are interrogated in turn 336, and the status report placed in appropriate memory locations 338 in CPU unit 60. Thus, interrogation hardware interrogates a specific hardware unit, and passes the information upon receipt to the status report area of the computer where it is stored in the appropriate location 340. As indicated in the following decision diamond 342, if additional equipment needs to be interrogated, an appropriate loop is made back to the interrogated hardware and the previous steps repeated. When all hardware has been interrogated, the interrogation process continues to the CPU registers where sampling of each appropriate register in the CPU which keeps track of specific pieces of information relative to the mail usage is indicated 344. Thus, the CPU register storage will include information such as statistical data relating to use of the device, number of times appropriate categories and different weight classes have been employed, number of classes used, geographic distribution of mail, statistical data relating to the use of zip codes, statistical data relating to the use of specific mail pieces, statistical data relating to the use of bulk mail versus individual piece mail, specific data relating to the use of classification of mail, and other types of information utilized by the specific apparatus which are part of the certification procedure. Next, the descending register balance is interrogated 346, and then all of the data is accumulated appropriately and transmitted through the high speed data link 70 to the central station 348. Suitable data transmission techniques are employed with appropriate error checking and confirming feedback signals. Upon failure to confirm transmission, as indicated in the decision block 352 following the confirmed transmission block 350, retransmission takes place. Although not indicated, standard techniques for repeating the transmission a multiple number of times awaiting error-free transmission may be employed. Final failure to transmit the information error-free will result in a specific alarm raised at the central station indicating that the local user unit is inoperative for transmission purposes. Such a defect would be considered a hard defect, and would result in shutdown of the machine. The hard error HE decision block 354, based upon a multiple number of unconfirmed transmissions, would result in shutdown, block SD 356. Upon the confirmation of appropriate transmission, any reply from the central station is awaited by the local user unit in the next REPLY block 358. This reply may include information results regarding diagnostics concerning the local user's machine; it may also include a specific display provided by the central station 360 of the time, date and name of the mechanic who will appear to fix the local user's unit. If the information displayed is to be stored 362 it is placed in the appropriate storage of the CPU for later display upon further interrogation routines or upon status checks by the local user. The routine at this point ends 366.

It will be apparent that the certification stamp thus assures that all critical components are in proper working order as well as the fact that the postage applied is accurate.

Turning next to flow chart 5C, a flow chart indicating the general concept of mail tracking is illustrated. The mail tracking utilizes the encryption placed upon the mail piece by the certification mechanism. It should be understood, however, that mail tracking can take place by additional encryption or bar coding of information on the mail piece, unrelated to the certification stamp placed thereon. In this embodiment, since the certification stamp is part of the operational process of the machine, and is an encryption coded key line, it is convenient for the system to utilize this key line piece of information for mail tracking purposes. After release of the mail piece from the local user'station and delivery to the central postage facility, and assuming the use of all automatic equipment in the central postage facility based upon the work sharing concepts reducing the amount of effort necessary by the central post office, information is captured at each entry point. By the use of appropriate OCR or other reading equipment, and of scales or like weighing equipment, each entry point into the delivery chain after release of the mail piece by the local user may be a data input point. Thus, the delivery service may possess input equipment which allows each piece of mail upon transfer to the delivery service to be inputted into a central database system indicating the specific location of the mail piece. Upon transfer of the mail piece from one location to the next, an appropriate tag or dataline is placed upon the mail piece certification encryption key line when entered into the database. By coordinating the database through the U.S. Postal Service central database, at each entry point into the system, the operator may be able to inquire, through the central station and thence through to the U.S. Postal Service, by key line, of the specific location of a mail piece as well as additional data regarding that mail piece, such as weight and destination address. Since each mail piece certification key line will have a tag attached thereto, which is continuously updated as the mail piece goes from input point to input point along the delivery chain, the user should receive back an indication based upon such added key line of the location of the specific mail piece. In this way, the key line tracking on the mail or parcel is utilized both to identify the parcel and by so doing with suitable encryption provide the mechanism to identify its location in the system. Referring now to the flowchart, each step in this process as it occurs in the user status CPU is illustrated. First is the inquiry step 310, effected by transmitting an inquiry request through the keyboard of the local user station into the CPU and thence to the IO device and across the data link into the central station 372. In the central station such inquiry request is recognized and transmitted between the two CPUs out across the data link to the U.S. Postal Service communication facilities 374. In the local unit 10, the inquiry request is routed to central and a confirmed transmission 376, with hard error time out 378 and appropriate alarm 380, results in a reply of a code line 382 which is analyzed with the CPU to strip out the suffix locator code 384, which is then compared in a table lookup database 386 previously incorporated in the CPU from downloaded information received from the central station for identification based upon such suffix, and the result displayed on the display terminal of the local user 388.

Figure 5D:
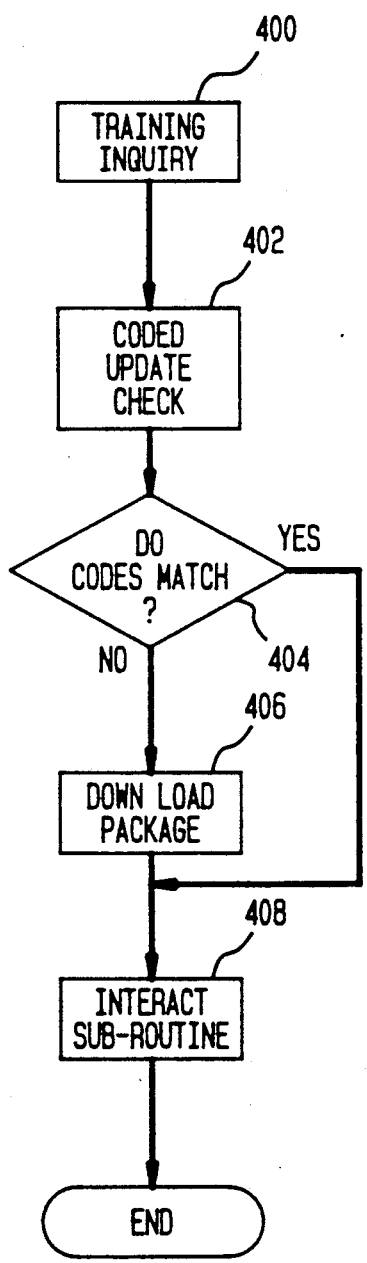

The downloading of information for the purpose of allowing communication such as training packages and other information to the transmitted from the central unit to the local units are illustrated in FIG. 5D. The ability to download information in large quantities allows the central station provide training packages to the local station, which may be employed by the local user for training new employees and acquainting new employees on various postal procedures and other means and manners which by postal efficiency may be achieved under the work sharing concept. This includes training current employees in new technique in mailing and also may be employed as a self-instruction mode interactively with the terminal for assisting in the training of employees. The system also allows downloading of third party advertising to allow a customer to provide third party advertising, thereby further discounting the cost of their own mailing, or to download interesting graphics or other type of advertising for a particular mailing.

Referring to FIG. 5D, a training inquiry is initiated by keyboard and local users 400. The request is routed to the data center. In response, the data center transmits a code representing the most recent updated training package 402. Upon receipt, the local user compares this code to its most recent coded update previously stored in local memory 404. If the latest data center program matches the stored program, the downloading step is stopped and the training program begins as an interactive subroutine 408. If it is not the latest version, the downloading is completed 406 and the subroutine runs with the latest version in local memory. Thus, each local user training session will employ the latest updated training package.

Figure 6:
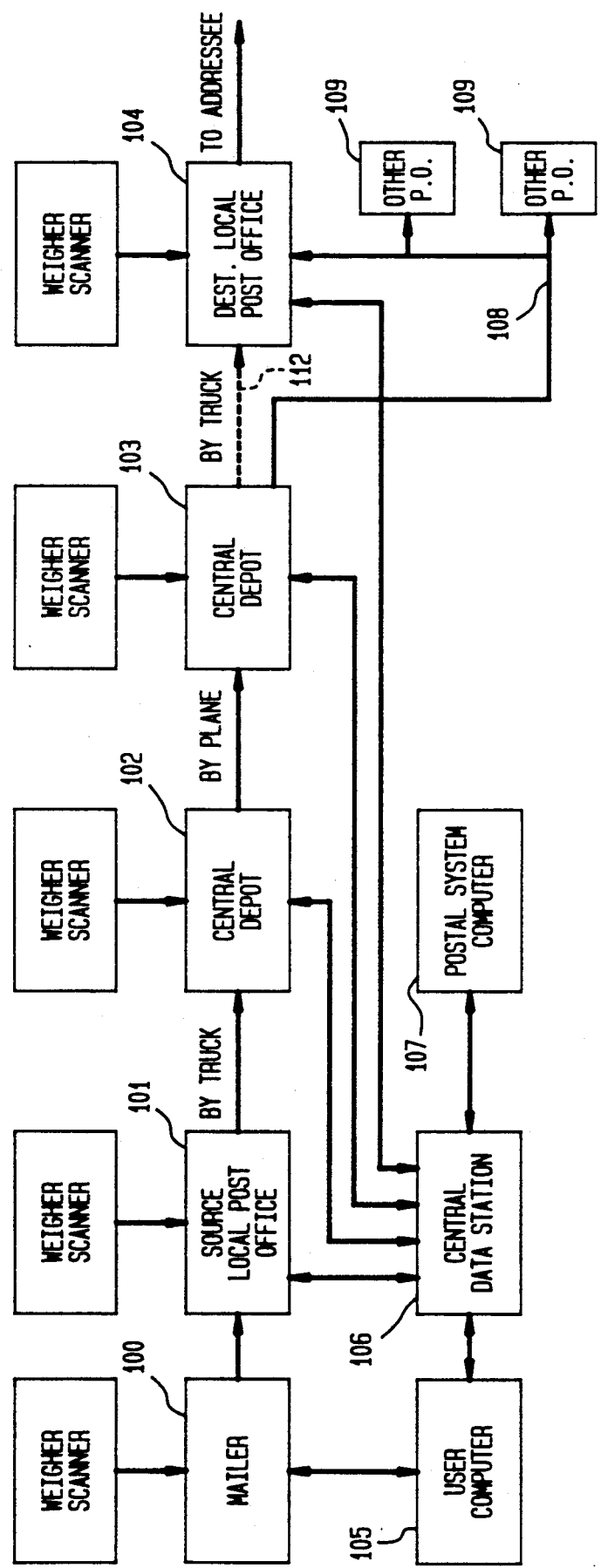
FIG. 6 is a block diagram of a system according to the invention.

FIG. 6 illustrates, schematically, the progress of a mail piece from its source to its destination. After processing, addressing, franking, and certification if desired at the mailer's or user's facility 100, including application to the mail piece of the tracking code, the mail piece is delivered to the local Post Office 101. It is then typically trucked to a central depot 102 for the region, and it then travels by plane to the corresponding central depot 103 local to the destination zip code, moved by truck along the solid line route 108 where other mail is dropped off at various stops 109 along the truck route, until the tagged mail pieces arrives at the destination local Post Office 104 where it is then delivered to the addressee. The mailer 100 is in communication with his own computer 105 (corresponding to block 10 in FIG. 2), which in turn is in communication with the data processing facility or data center 106 (corresponding to block 18 in FIG. 1), which in turn is in communication with the Postal System 107 (corresponding to block 20).

As previously described, each of the mail processing stations 101-104 has its own data processing facility which is in communication with the central data station 106, either directly or via the Postal System computer. Each of the stations 101-104 would be provided with weighing and scanning facilities comparable to that illustrated in FIG. 4, that would allow each station to read the tracking code, read the destination address, and weigh the mail piece, store that information in a local database if desired, and communicate that information to the central data station 106 which would be maintaining a system database.

Figure 7:
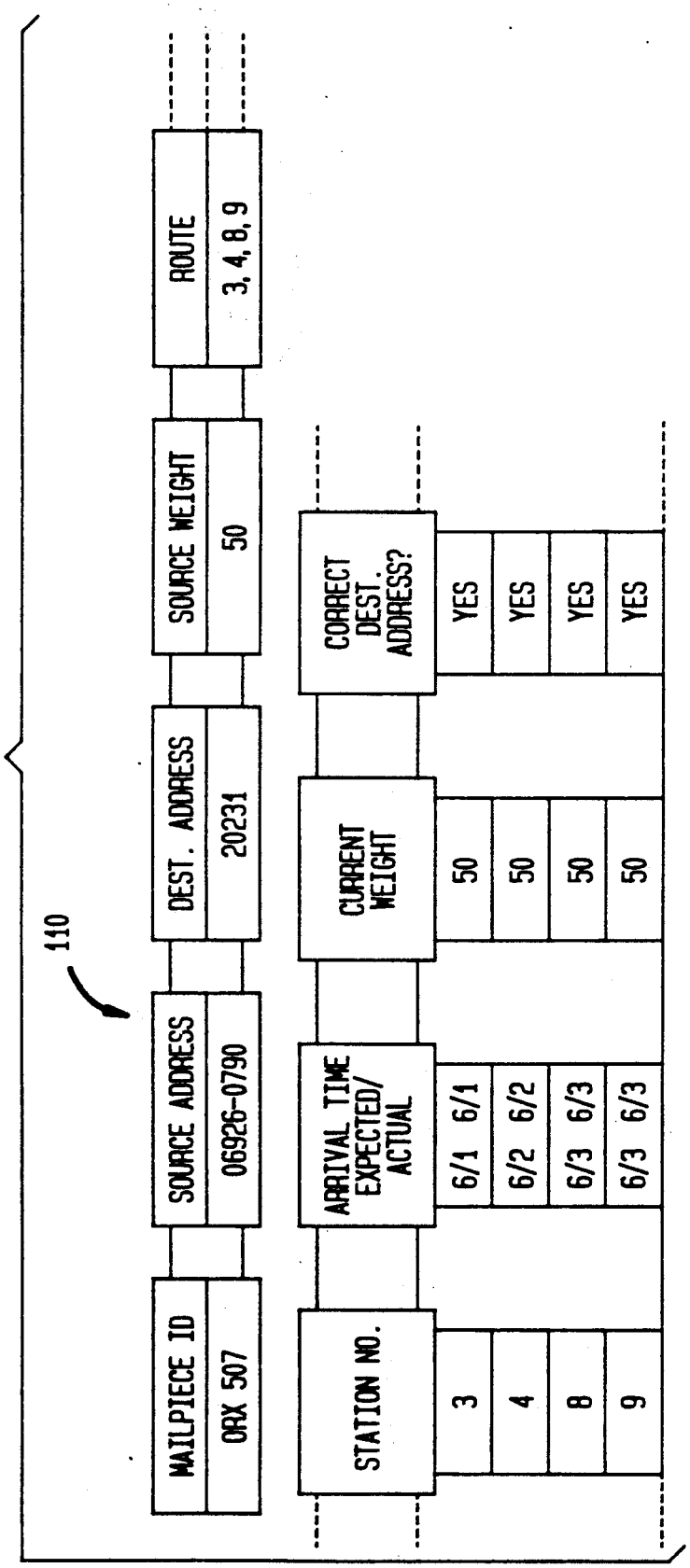
FIG. 7 illustrates a database for storing information relevant to the system of the invention.
Figure 8:
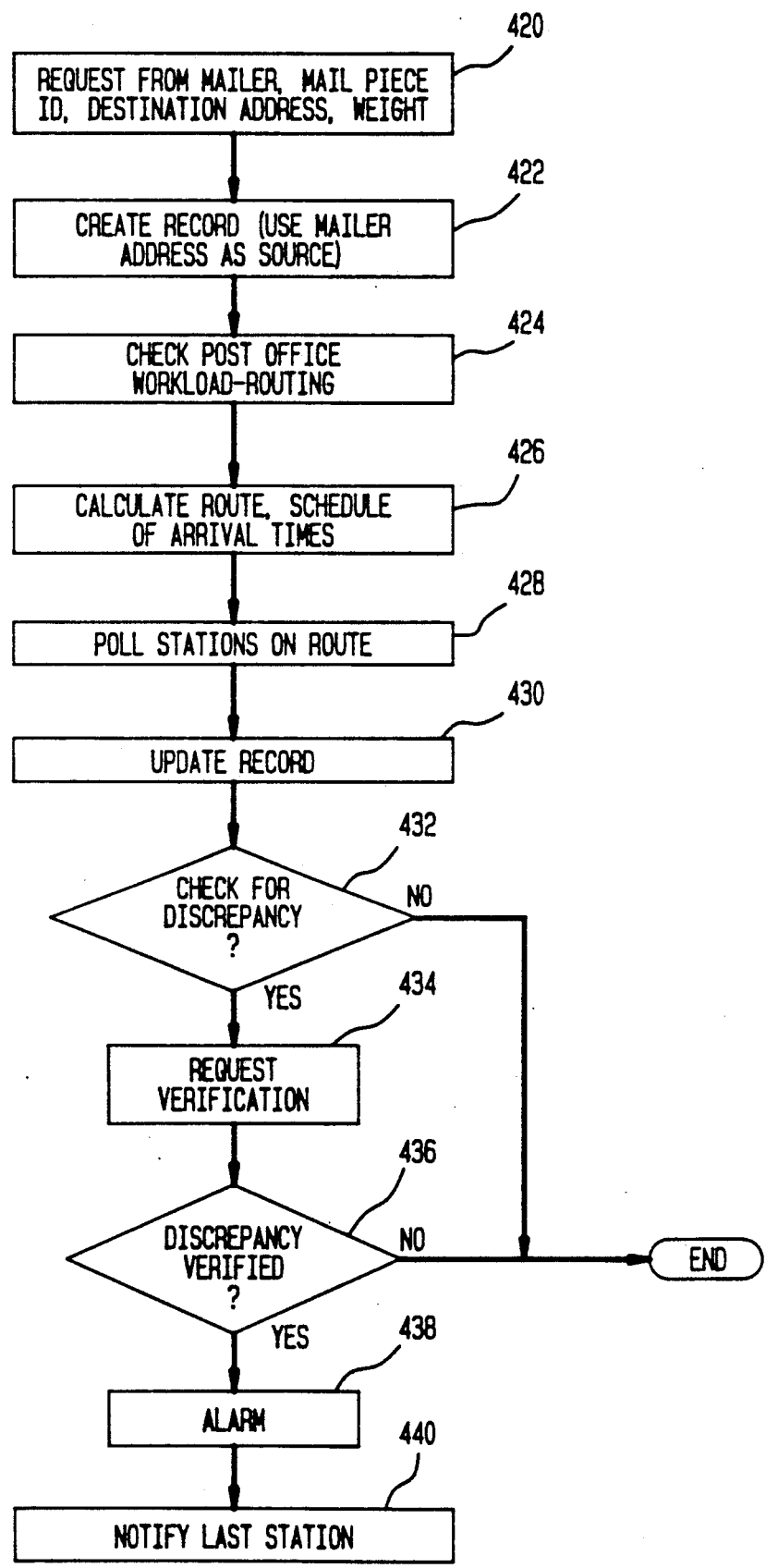
FIGS. 8 and 9 are flow charts illustrating different aspects of the system of the invention.

A typical database maintained at the central station 106 is illustrated in FIG. 7 with additional reference to FIG. 8. For each tracked coded mail piece, on entry into the system, a record 110 would be created 422 containing an ID for the mail piece, its source and destination address, and its weight as measured by the mailer 420. The central processor would then compute the expected route 426, taking into account information obtained from the Postal System concerning the current routing for such destined mail pieces 424. The routing information, which is a listing of the processing stations through which the mail piece will pass 428, is entered in the data base 430. In addition, again taking into account the current Postal System workload, the expected arrival times of the mail piece at each processing station would be entered. When the mail piece arrives at a processing station, its actual arrival time, current weight, and whether its current destination address matches the original destination address, would be determined 432 and entered into the database 434. A minor late arrival would trigger the central data station to recalculate the subsequent arrival times and update the database. Any significant discrepancy 436 between the current weight and current destination address, compared with the originals, would trigger an alert in the system. Similarly, the failure of the mail piece to arrive on time will cause an alert 438. This alert can be responded to, firstly, by the central data station interrogating the user facility and processing station to verify their data 436. When it becomes clear that the discrepancy is real, then the station which last reported the arrival of the proper mail piece, would be instructed to immediately institute a search for the missing piece, or to intercept the mail piece and promptly investigate the reason for the discrepancy 440.

An appropriate flow chart for the central data station 106 illustrating this sequence of events is illustrated in FIG. 8. The text in the various blocks follows the description given above, and need not be elaborated on any further.

The existence at the data center 106 of a database that maintains records of numbers of mail pieces in the system offers other important advantages besides reducing theft or locating missing pieces. The database is easily processed by standard database processing techniques to determine the number of tracked articles that have left previous delivery stages and are expected to arrive at a next stage along the route. Thus, workloads, current and forecasted or expected, at each stage along the route can be determined. This information is useful to managers of the delivery system, who in anticipation of processing expected mail to certain destinations can marshal their resources to more efficiently process the arriving mail. For instance, air and truck schedules and routes can be adapted to the anticipated load of mail pieces, or in a flexible work time environment, personnel start and quit times can be adjusted to match heavy workload periods.

An important underlying concept in the system of the invention, illustrated above, is that the possession of detailed information concerning the number and current and future locations of mail pieces in a centrally-maintained database allows the system not only to handle more efficiently mail delivery, but also allows the system to initiate corrective actions when something is amiss. For instance, suppose mail pieces arrive late at a particular delivery stage. This would cause delayed arrival at all subsequent stages. The data center can automatically correct for this by updating its database to store newly-calculated arrival times, to avoid triggering alarms at all subsequent stages. On the other hand, suppose that on-time arrival is important, for expedited mail or because of resource availability. In the latter event, the data center can recalculate a route for the delayed mail to make up for lost time, when the situation permits of such a correction. This is illustrated in FIG. 6. The delayed mail can be specially trucked along the new route indicated by the dashed line 112 directly to the destination local Post Office 104. Alternatively, the data center 106, instead of plotting an expedited route, can notice the previous delivery stage 103 that when certain tracked mail pieces arrive, that delivery stage 103 should take whatever measures are available to expedite delivery to the next stage 104.

Figure 9:
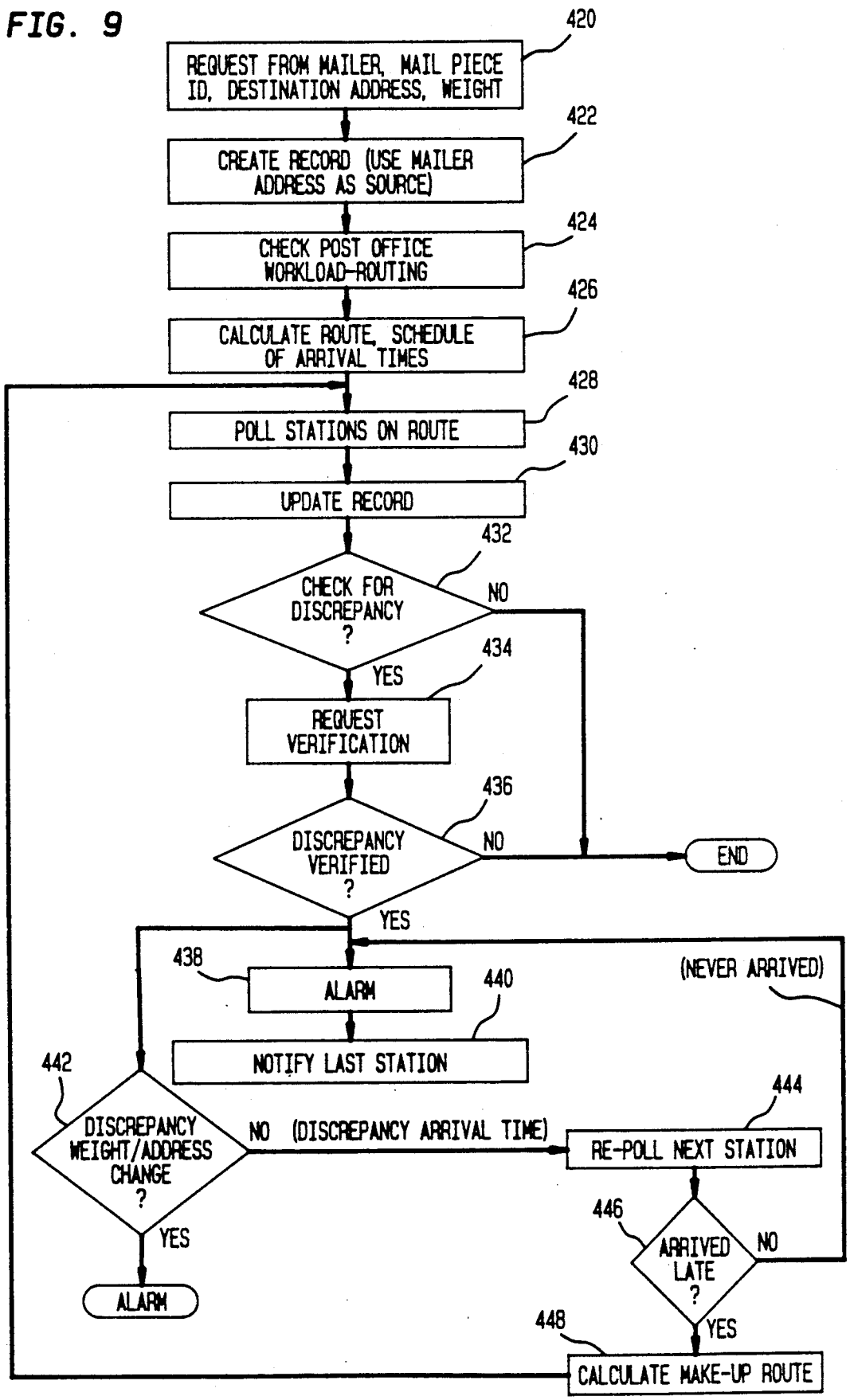

Variations of these features is illustrated in the flow chart of FIG. 9. The upper half is similar to the FIG. 8 flow chart. The difference is that an additional branch is taken before the alarm in order to determine whether the discrepancy is in arrival time or in weight or address changes 442. If the latter, then an alarm is sounded, since theft may be indicated. If arrival time is the discrepancy, then, when confirmed, an additional branch follows 444, depending on whether the arrival is just delayed or the mail piece does not arrive after a reasonable wait. If just delay is involved 446, a make-up route is calculated 448, the mail piece record updated, and its progress through the remaining stages monitored as before. If no arrival is the problem, then again the alarm is sounded as previously described. The make-up route calculation is just one example of prompt corrective actions possible in the system of the invention thereby to enhance and improve mail delivery through the system.

It will be evident from the foregoing that modifications of the monitoring system described can be effected without departing from the principles of the invention. For example, while it is preferred that the database records illustrated in FIG. 7 be maintained at the central data station, it is also possible for the database to be maintained by each user for its own mail pieces. Also, the records could contain actual weights and destination addresses as determined at each delivery stage, or simply a YES/NO check whether the current weight and destination address conform to that recorded by the mailer.

It will further be understood that the description given above for tracking mail pieces equally applies to mail packages as defined by the Post Office, which includes boxes as well as trays, containers or pallets containing a mail batch intended to be delivered as a unit to a destination station. In the latter cases, the mail ID for tracking purposes would be applied to the batch container rather than to the individual mail items making up the batch. Hence, the term "mail piece" or "article" as used herein is intended to include not only individual mail pieces, but also a tray, container or pallet containing multiple mail pieces and which is being treated by the delivery system as a single trackable entity.

The forgoing preferred embodiment may be varied within the spirit and scope of the invention, the expression of which is set forth in the appended claims.

What is claimed is:

1. A system for tracking an article through a delivery system employing a plurality of uniquely identified delivery stages, comprising: a station for preparing said article for entry into said system, said preparing station including codification means for placing a tracking code on said article, a tracking station, a communication link connecting said tracking station to each of said delivery stages, means at said tracking station for determining a schedule of approximate arrival times at each of said delivery stages for a tracked article, means for accessing each of said delivery stages to determine the presence of said article with said tracking code, and means responsive to receipt of a response from a delivery stage indicating the said tracked article has not arrived at said delivery stage on schedule for causing said system to take actions in connection with the late article.

2. A system for tracking an article through a delivery system employing a plurality of uniquely identified delivery stages, comprising: a station for preparing said article for entry into said system, said preparing station including codification means for placing a tracking code on said article, a tracking station, a communication link connecting said tracking station to each of said delivery stages, means at said tracking station for determining a schedule of approximate arrival times at each of said delivery stages for a tracked article, means for accessing each of said delivery stages to determine the presence of said article with said tracking code, and means responsive to receipt of a response from a delivery stage indicating the said tracked article has not arrived at said delivery stage on schedule for causing said system to initiate a search for the late article.

3. A system as claimed in claim 2, wherein the searchinitiating means includes means for notifying the previous delivery stage that had last reported timely arrival of the tracked article to search for the tracked article.

4. A system as claimed in claim 2, wherein the schedule-determining means includes means for calculating the expected route of the tracked article through the system.

5. A self-monitoring system for tracking mail articles through a mail delivery system, comprising a plurality of separate delivery stages in the system for the mail, each of said delivery stages comprising means for recognizing tracking codes associated with said mail articles, a user station for preparing mail articles for entry into said delivery system, said user station including coding means for placing a tracking code on said mail articles, a computerized central data station, communication links connecting said user station to said central data station and said delivery stages to said central data station, said central data station including means responsive to a tracking request for interrogating each of said delivery stages over said communication link for the presence thereat of the mail articles being tracked, said central data station including means for determining a schedule of approximate arrival times at each of said delivery stages for a tracked article, and means in response to a failure of a tracked article to arrive on time at a delivery stage to initiate a search within the system for said late article.

6. A system for monitoring articles through a delivery system employing a plurality of uniquely identified delivery stages, comprising: a station for preparing said articles for entry into said system, said preparing station including codification means for placing a tracking code on said articles, a data center, a communication link connecting said data center to each of said delivery stages, means at said data center for determining a schedule of approximate arrival times at each of said delivery stages for tracked articles, means for communicating with each of said delivery stages to determine the presence of said articles with said tracking code, and means at said data center for informing a delivery stage of the expected time of arrival of tracked articles.

7. A system as claimed in claim 6, further comprising means at said data center for notifying a previous delivery stage when tracked articles fail to arrive on schedule at a next delivery stage.

8. A system as claimed in claim 6, further comprising means at the data center for maintaining records of tracked articles and their current location in the delivery system.

9. A self-monitoring system for tracking mail articles through a mail delivery system, comprising a plurality of separate delivery stages in the system for the mail, each of said delivery stages comprising means for recognizing tracking codes associated with said mail articles, a user station for preparing mail articles for entry into said delivery system, said user station including coding means for placing a tracking code on said mail articles, a computerized data center, communication links connecting said user station to said data center and said delivery stages to said data center, said data center including means for communicating with each of said delivery stages over said communication link for determining the presence thereat of the mail articles being tracked, said data center including means for maintaining a schedule of approximate arrival times at each of said delivery stages for a tracked article, and means in response to delayed arrival of a tracked article at a delivery stage to initiate actions within the system to mitigate the effect of the delayed arrival.

10. A system as claimed in claim 9, wherein the actions taken include means at the data center for rerouting the delayed article to expedite its passage through the delivery stages.

11. A method for self-monitoring a delivery system employing multiple stages through which pass articles to be deliverd from a source to a destination, comprising the steps:
(a) at the source applying a unique ID to each article to be tracked through the system,
(b) determining the route of a tracked article through the system,
(c) determining a schedule of approximate arrival times of a tracked article at each stage of the route,
(d) determining the actual arrival times of a tracked article at each stage of its route,
(e) determining when a tracked article has not timely arrived at a delivery stage,
(f) taking actions in response to the determination made in step (e).

12. A method for self-monitoring a delivery system employing multiple stages through which pass articles to be delivered from a source to a destination, comprising the steps:
(a) at the source applying a unique ID to each article to be tracked through the system,
(b) determining the route of a tracked article through the system,
(c) determining a schedule of approximate arrival times of a tracked article at each stage of the route,
(d) determining the actual arrival times of a tracked article at each stage of its route,
(e) determining when a tracked article has not timely arrived at a delivery stage,
(f) initiating a search for the delayed or missing article in response to the determination made in step (e).

13. A method as claimed in claim 12, wherein step (f) is carried out by at least informing the preceding delivery stage where the tracked article timely arrived.

14. A method as claimed in claim 12, wherein the articles are mail articles.

15. A method for improving a delivery system employing multiple stages through which pass articles to be delivered from a source to a destination, comprising the steps:
(a) at the source applying a unique ID to each article to be tracked through the system,
(b) determining the routes of tracked articles through the system,
(c) determining a schedule of approximate arrival times of the tracked articles at each stage of the route,
(d) determining the actual arrival times of a tracked article at each stage of its route,
(e) in response to a determination made in step(d) at a previous stage, informing the next stage in the route of the expected time of arrival of tracked articles.

16. A method as claimed in claim 15, wherein the articles are mail articles.

17. A method for self-monitoring a delivery system employing multiple stages through which pass articles to be delivered from a source to a destination, comprising the steps:
(a) at the source applying a unique ID to each article to be tracked through the system,
(b) determining the route of a tracked article through the system,
(c) determining a schedule of approximate arrival times of a tracked article at each stage of the route,
(d) determining the actual arrival times of a tracked article at each stage of its route,
(e) determining when a tracked article has a delayed arrived at a delivery stage,
(f) recalculating the route of the delayed article through the delivery system to expedite its delivery.

18. The method of claim 17, including the step of initiating a search for the delayed or missing article.

19. A method as claimed in claim 6, wherein the articles are mail articles.

* * * * *